United States Patent
Thampy et al.

(10) Patent No.: US 7,283,984 B1
(45) Date of Patent: Oct. 16, 2007

(54) METHOD AND APPARATUS FOR OPTIMIZING SUPPORT VECTOR MACHINE KERNEL PARAMETERS

(75) Inventors: Sajjit Thampy, La Jolla, CA (US); Aleksey M. Urmanov, San Diego, CA (US); Kenny C. Gross, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 326 days.

(21) Appl. No.: 11/049,146

(22) Filed: Feb. 1, 2005

(51) Int. Cl.
*G06F 17/00* (2006.01)
*G06N 5/00* (2006.01)

(52) U.S. Cl. .................................................. 706/45
(58) Field of Classification Search ............. 706/45–46
See application file for complete search history.

(56) References Cited

U.S. PATENT DOCUMENTS

| | | | |
|---|---|---|---|
| 6,714,925 B1* | 3/2004 | Barnhill et al. ............... | 706/48 |
| 6,760,715 B1* | 7/2004 | Barnhill et al. ............... | 706/16 |
| 6,789,069 B1* | 9/2004 | Barnhill et al. ............... | 706/12 |
| 6,882,990 B1* | 4/2005 | Barnhill et al. ............... | 706/16 |
| 7,003,403 B1* | 2/2006 | Dougherty et al. ........... | 702/19 |
| 7,117,185 B1* | 10/2006 | Aliferis et al. ................ | 706/12 |
| 2003/0175753 A1* | 9/2003 | Shaughnessy et al. ......... | 435/6 |
| 2003/0232364 A1* | 12/2003 | Shaughnessy et al. ......... | 435/6 |
| 2004/0009523 A1* | 1/2004 | Shaughnessy et al. ......... | 435/6 |
| 2005/0049985 A1* | 3/2005 | Mangasarian et al. ........ | 706/45 |
| 2005/0049990 A1* | 3/2005 | Milenova et al. ............. | 706/48 |
| 2005/0112630 A1* | 5/2005 | Shaughnessy et al. ......... | 435/6 |
| 2005/0228783 A1* | 10/2005 | Shanahan et al. ............... | 707/3 |
| 2005/0240544 A1* | 10/2005 | Kil et al. ....................... | 706/45 |

OTHER PUBLICATIONS

A preliminary study of airport freight traffic forecasting based on least squares support vector machine Zhen-Rui Peng; Pu Gao; Jian-Jun Meng; Wen-Zhe Qi; Machine Learning and Cybernetics, 2005. Proceedings of 2005 International Conference on vol. 6, Aug. 18-21, 2005 pp. 3680-3685 vol. 6 Digital Object Identifier 10.1009/ICMLC.2005.15275.*

(Continued)

*Primary Examiner*—Anthony Knight
*Assistant Examiner*—Michael B. Holmes
(74) *Attorney, Agent, or Firm*—Park, Vaughan & Fleming LLP (57) ABSTRACT

One embodiment of the present invention provides a system that optimizes support vector machine (SVM) kernel parameters. During operation, the system assigns sets of kernel parameter values to each node in a multiprocessor system. Next, the system performs a cross-validation operation at each node in the multiprocessor system based on a data set. This cross-validation operation computes an error cost value reflecting the number of misclassifications that arise while classifying the data set using the assigned set of kernel parameter values. The system then communicates the computed error cost values between nodes in the multiprocessor system, and eliminates nodes with relatively high error cost values. Next, the system performs a cross-over operation in which kernel parameter values are exchanged between remaining nodes to produce new sets of kernel parameter values. This process is repeated until a global winning set of kernel parameter values emerges.

17 Claims, 8 Drawing Sheets

OTHER PUBLICATIONS

Adapting multiple kernel parameters for support vector machines using genetic algorithms Rojas, S.A.; Fernandez-Reyes, D.; Evolutionary Computation, 2005. The 2005 IEEE Congress on vol. 1, Sep. 2-5, 2005 pp. 626-631 vol. 1 Digital Object Identifier 10.1109/CEC.2005.1554741.*

A kernal logit approach for face and non-face classification Hasegawa, O.; Kurita, T.; Applications of Computer Vision, 2002. (WACV 2002). Proceedings. Sixth IEEE Workshop on Dec. 3-4, 2002 pp. 100-104 Digital Object Identifier 10.1109/AVC.2002.1182165.*

Face and non-face classification by multinomial logit model and kernel feature compound vectors Hasegawa, S.; Kurita, T.I.; Neural Information Processing, 2002, ICONIP '02. Proceedings of the 9th International Conference on vol. 2, Nov. 18-22, 2002 pp. 996-1000 vol. 2 Digital Object Identifier 10.1109/ICONIP.2002.1198210.*

Information criteria for suppoort vector machines Kobayashi, K.; Komaki, F.; Neural Networks, IEEE Transactions on □□vol. 17, Issue 3, May 2006 pp. 571-577 Digital Object Identifier 10.1109/TNN.2006.873276.*

Sparse kernel density construction using orthogonal forward regression with leave-one-out test score and local regularization Sheng Chen; Xia Hong; Harris, C.J.; Systems, Man and Cybernetics, Part B, IEEE Trasnactions on vol. 34, Issue 4, Aug. 2004 pp. 1708-1717 Digital Object Identifier 10.1109/TSMCB.2004.828199.*

Margin-like quantities and generalized approximate cross validation for support vector machines Wahba, G.; Yi Lin; Hao Zhang; Neural Networks for Signal Processing IX, 1999. Proceedings of the 1999 IEEE Signal Processing Society Workshop Aug. 23-25, 1999 pp. 12-20 Digital Object Identifier 10.1109/NNSP.1999.788118.*

Support Vector Machines and Other Pattern Recognition Approaches to the Diagnosis of Cerebral Palsy Gait Kamruzzaman, J.; Begg, R. R.; Biomedical Engineering, IEEE Transactions on vol. 53, Issue 12, Part 1, Dec. 2006 pp 2479-2490 Digital Object Identifier 10.1109/TBME.2006.883697.*

COMPARE: Classification of Morphological Patterns Using Adaptive Regional Elements Fan, Y.; Shen, D.; Gur, R. C.; Gur, R. E.; Davatzikos, C.; Medical Imaging, IEEE Transactions on vol. 26, Issue 1, Jan. 2007 pp. 93-105 Digital Object Identifier 10.1109/TMI.2006.886812.*

Optimizing Support Vector regression hyperparameters based on cross-validation Ito, K.; Nakano, R.; Neural Networks, 2003. Proceedings of the International Joint Conference on vol. 3, Jul. 20-24, 2003 pp. 2077-2082 vol. 3 Digital Object Identifier 10.1109/IJCNN.2003.1223728.*

Bayesian Gaussian Process Classification with EM-EP Algorithm Hyun-Chul Kim; Ghahramani, Z.; Pattern Analysis and Machine Intelligence, IEEE Transactions on vol. 28, Issue 12, Dec. 2006 pp. 1948-1959 Digital Object Identifier 10.1109/TPAMI.2006.238.*

Leave-One-Out Cross-Validation Based Model Selection Criteria for Weighted LS-SVMs Cawley, G.C.; Neural Networks, 2006 IJCNN '06. International Joint Conference on Jul. 16-21, 2006 pp. 1661-1668.*

SVM Models in the Diagnosis of Balance Impairments Begg, R.; Lai, D.; Taylor, S.; Palaniswami, M.; Intelligent Sensing and Information Processing, 2005. ICISIP 2005. Third International Conference on Dec. 14-17, 2005 pp. 248-253.*

A novel approach to intrusion detection based on SVD and SVM Xin min Tao; Fu rong Liu; Ting xian Zhou; Industrial Electronics Society, 2004. IECON 2004. 30th Annual Conference of IEEE vol. 3, Nov. 2-6, 2004 pp. 2028-2033 vol. 3 Digital Object Identifier 10.1109/IECON.2004.1432108.*

A similarity learning approach to content-based image retrieval: application to digital mammography El-Naqa, I.; Yongyi Yang; Galatsanos, N.P.; Nishikawa, R.M.; Wernick, M.N.; Medical Imaging, IEEE Transactions on vol. 23, Issue 10, Oct. 2004 pp. 1233-1244 Digital Object Identifier 10.1109/TMI.2004.834601.*

Support vector machines for automated gait classification Begg, R.K.; Palaniswami, M.; Owen, B.; Biomedical Engineering, IEEE Transactions on vol. 52, Issue 5, May 2005 pp. 828-838 Digital Object Identifier 10.1109/TBME.2005.845241.*

Gene Selection for Cancer Classification using Wilcoxon Rank Sum Test and Support Vector Machine Chen Liao; Shutao Li; Zhiyuan Luo; Computational Intelligence and Security, 2006 International Conference on vol. 1, Nov. 2006 pp. 368-373 Digital Object Identifier 10.1109/ICCIAS.2006.294156.*

Stepwise Feature Selection by Cross Validation for EEG-based Brain Computer Interface Tanaka, K.; Kurita, T.; Meyer, F.; Berthouze, L.; Kawabe, T.; Neural Networks, 2006. IJCNN '06. International Joint Conference on Jul. 16-21, 2006 pp. 4672-4677.*

Yet faster method to optimize SVR hyperparameters based on minimizing cross-validation error Kobayashi, K.; Kitakoshi, D.; Nakano, R.; Neural Networks, 2005. IJCNN '05. Proceedings. 2005 IEEE International Joint Conference on vol. 2, Jul. 31-Aug. 4, 2005 pp. 871-876 vol. 2.*

A New Methodology Based on q-Entropy for Breast Lesion Classification in 3-D Ultrasound ImagesRodrigues, P.S.; Giraldi, G.A.; Provenzano, M.; Faria, M.D.; Ruey-Feng Chang; Suri, J.S.; Engineering in Medicine and Biology Society, 2006. EMBS '06 28th Annual International Conference of the IEEE Aug. 2006 pp. 1048-1051.*

Kernelized based functions with Minkovsky's norm for SVM regression Ribeiro, B.; Neural Networks, 2002. IJCNN '02. Proceedings of the 2002 International Joint Conference on vol. 3, May 12-17, 2002 pp. 2198-2203 Digital Object Identifier 10.1109/IJCNN.2002.1007482.*

An empirical assessment of kernel type performance for least squares support vector machine classifiersBaesens, B.; Viaene, S.; Van Gestel, T.; Suykens, J.A.K.; Dedene, G.; De Moor, B.; Vanthienen, J.; Knowledge-Based Intelligent Engineering Systems and Allied Technologies, 2000. Proceedings. Fourth International Conference on vol. 1.*

Feature selection based on genetic algorithms and support vector machines for handwritten similar Chinese characters recognition Jun Feng; Yang Yang; Hong Wang; Xian-Mei Wang; Machine Learning and Cybernetics, 2004. Proceedings of 2004 International Conference on vol. 6, Aug. 26-29, 2004 pp. 3600-3605 vol. 6.*

On the optimal parameter choice for /spl nu/-support vector machines Steinwart, I.; Pattern Analysis and Machine Intelligence, IEEE Transactions on vol. 25, Issue 10, Oct. 2003 pp. 1274-1284 Digital Object Identifier 10.1109/TPAMI.2003.1233901.*

* cited by examiner

METHOD AND APPARATUS FOR OPTIMIZING SUPPORT VECTOR MACHINE KERNEL PARAMETERS

BACKGROUND

1. Field of the Invention

The present invention relates to computer-based classification techniques, which are used to identify members of groups of interest within data sets. More specifically, the present invention relates to a method and an apparatus that uses a parallel genetic computational technique to optimize kernel parameters for a support vector machine (SVM), wherein the SVM is subsequently used to classify members of a data set.

2. Related Art

Classification and pattern recognition techniques have wide-reaching applications. A number of life science applications use classification techniques to identify members of groups of interest within clinical data sets. For example, an important life science application is concerned with the classification of the protein signatures of patients who have some type of cancer from those who do not. This problem stems from the need in clinical trials to test the efficacy of a drug in curing cancer while the cancer is at an early stage. In order to do so, one needs to be able to identify patients who have cancer at an early stage.

Conventional diagnosis techniques are not sufficient for this application. A popular technique (from an area that has become known as "proteomics") is to analyze mass spectra, which are produced by a mass spectrometer from serum samples of patients. Depending on the type of cancer, the mass spectra of serum samples can show distinct signatures, which are not immediately visible to the naked eye. Several existing data mining techniques are presently used to distinguish the cancer spectra from the normal ones, such as Naïve Bayes, Decision Trees, Principle-Components-Analysis based techniques, Neural Networks, etc.

However, these existing techniques are characterized by false-alarm and missed-alarm probabilities that are not sufficiently small. This is a problem because false alarms can cause patients to experience anxiety, and can cause them submit to unnecessary biopsies or other procedures, while missed alarms can result in progression of an undetected disease.

Support Vector Machines (SVMs) provide a new approach to pattern classification problems. SVM-based techniques are particularly attractive for the cancer classification problem because SVM-based techniques operate robustly for high-dimensional feature data, unlike other techniques which have resource requirements that are closely coupled with feature dimensions.

SVM-based techniques typically use a "kernel function" to map the data set of interest from a low-dimensional input space to a higher-dimensional feature space. During this process, these techniques typically select a set of parameters for the kernel function so as to minimize the number of misclassifications that arise while classifying the data set.

Unfortunately, there presently exists no systematic technique for selecting the optimal kernel parameters for an SVM on a given data set. Consequently, SVM kernel parameters are typically optimized through time-consuming manual operations.

Hence, what is needed is a method and an apparatus that optimizes SVM kernel parameters without the problems described above.

SUMMARY

One embodiment of the present invention provides a system that optimizes support vector machine (SVM) kernel parameters. During operation, the system assigns sets of kernel parameter values to each node in a multiprocessor system. Next, the system performs a cross-validation operation at each node in the multiprocessor system based on a data set. This cross-validation operation computes an error cost value reflecting the number of misclassifications that arise while classifying the data set using the assigned set of kernel parameter values. The system then communicates the computed error cost values between nodes in the multiprocessor system, and eliminates nodes with relatively high error cost values. Next, the system performs a cross-over operation in which kernel parameter values are exchanged between remaining nodes to produce new sets of kernel parameter values. This process is repeated until a global winning set of kernel parameter values emerges.

In a variation on this embodiment, assigning sets of kernel parameter values involves assigning sets of random kernel parameter values from a valid range of kernel parameter values.

In a variation on this embodiment, assigning sets of kernel parameter values involves assigning sets of kernel parameter values associated with grid points that span a valid range of kernel parameter values.

In a variation on this embodiment, performing the cross-validation operation involves using a leave-out-one validation technique, in which one vector is omitted during the training process and the omitted vector is subsequently tested against the trained kernel, and wherein the process is repeated for each vector in the data set.

In a variation on this embodiment, eliminating nodes with relatively high error cost values involves: sorting nodes in the multiprocessor system based on associated error cost values; and eliminating half of the nodes with the highest error cost values.

In a variation on this embodiment, there are two kernel parameter values, $\gamma$ and $\delta$. In this variation, performing the cross-over operation involves exchanging $\gamma$ values between remaining nodes.

In a variation on this embodiment, classifying the data set using the assigned kernel parameter values involves using the assigned set of kernel parameter values in a kernel function that maps the data set from a low-dimensional input space to a higher-dimensional feature space. It also involves performing a quadratic optimization operation, which generates a substantially optimal decision surface in the feature space, wherein the decision surface classifies vectors in the data set with a given error cost.

BRIEF DESCRIPTION OF THE FIGURES

Table 1 presents pseudo-code for the kernel parameter optimization process in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs).

Multiprocessor System

Figure 1:
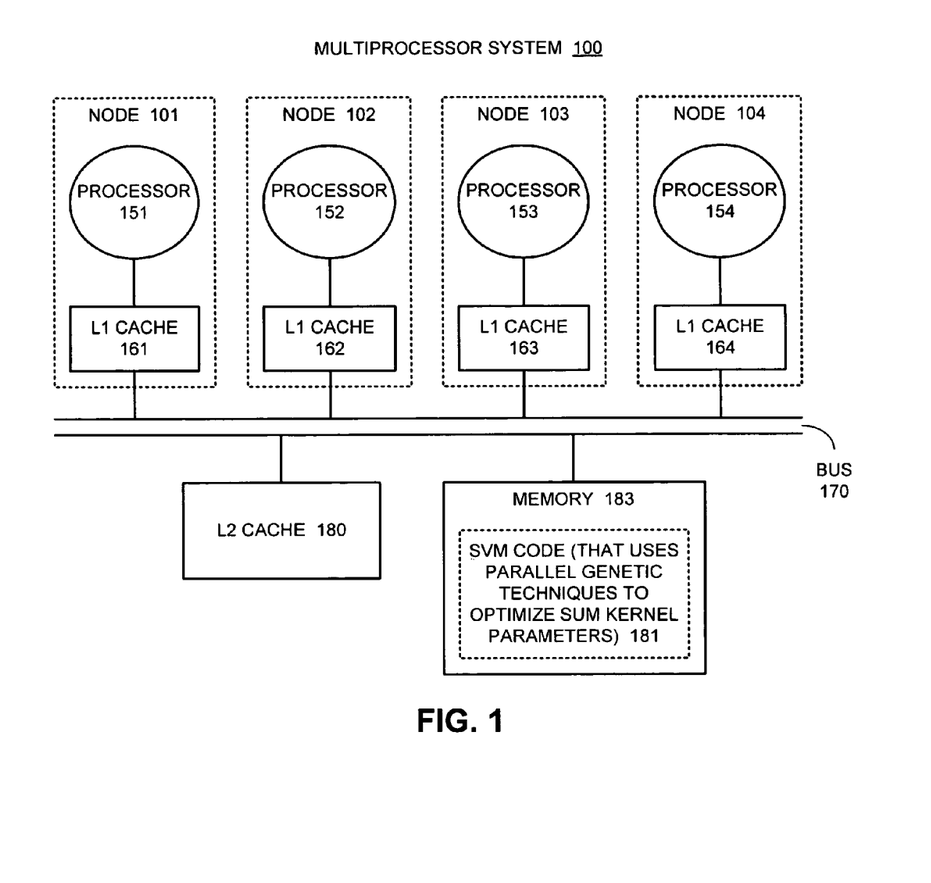
FIG. 1 illustrates a multiprocessor system in accordance with an embodiment of the present invention.

FIG. 1 illustrates an exemplary multiprocessor system 100 in accordance with an embodiment of the present invention. Multiprocessor system 100 is a shared-memory multiprocessor system, which includes a number of processors 151-154 coupled to level one (L1) caches 161-164 which share a level two (L2) cache 180 and a memory 183. During operation, if a processor 151 accesses a data item that is not present in local L1 cache 161, the system attempts to retrieve the data item from L2 cache 180. If the data item is not present in L2 cache 180, the system first retrieves the data item from memory 183 into L2 cache 180, and then from L2 cache 180 into L1 cache 161.

Multiprocessor system 100 also supports a coherency protocol that operates across bus 170. This coherency protocol ensures that if one copy of a data item is modified in L1 cache 161, other copies of the same data item in L1 caches 162-164, in L2 cache 180 and in memory 183 are updated or invalidated to reflect the modification.

Although the present invention is described in the context of the shared-memory multiprocessor system 100, the present invention is not meant to be limited to such a system. In general, the present invention can operate in any computer system or distributed system which contains multiple processors. For example, the present invention can operate in a distributed computing system in which separate computing systems are coupled together through a network. Hence, the term "multiprocessor system," as used in this specification and the appended claims, refers to any computer system or distributed system containing multiple processors which can work together on a given computational task.

Support Vector Machine

Figure 2A:
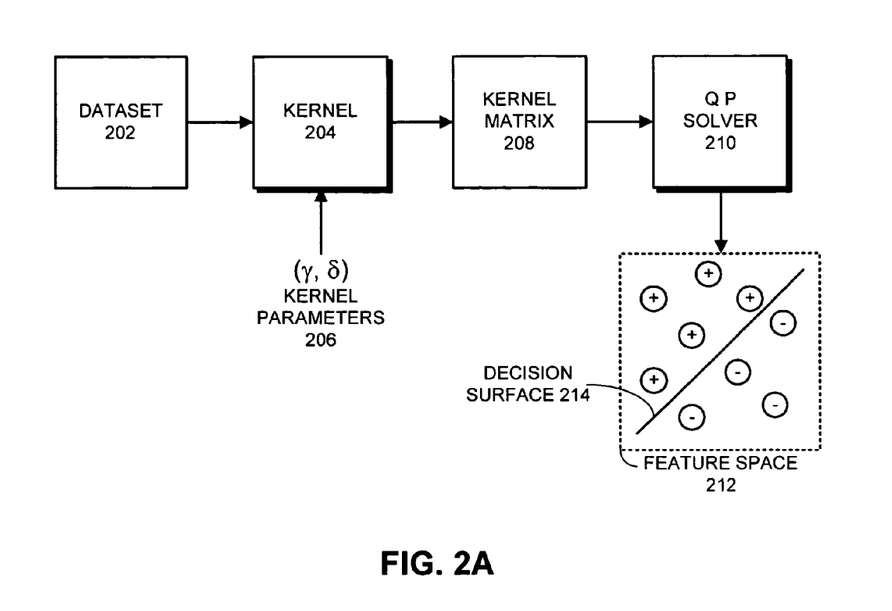
FIG. 2A illustrates how a support vector machine (SVM) operates in accordance with an embodiment of the present invention.
Figure 2B:
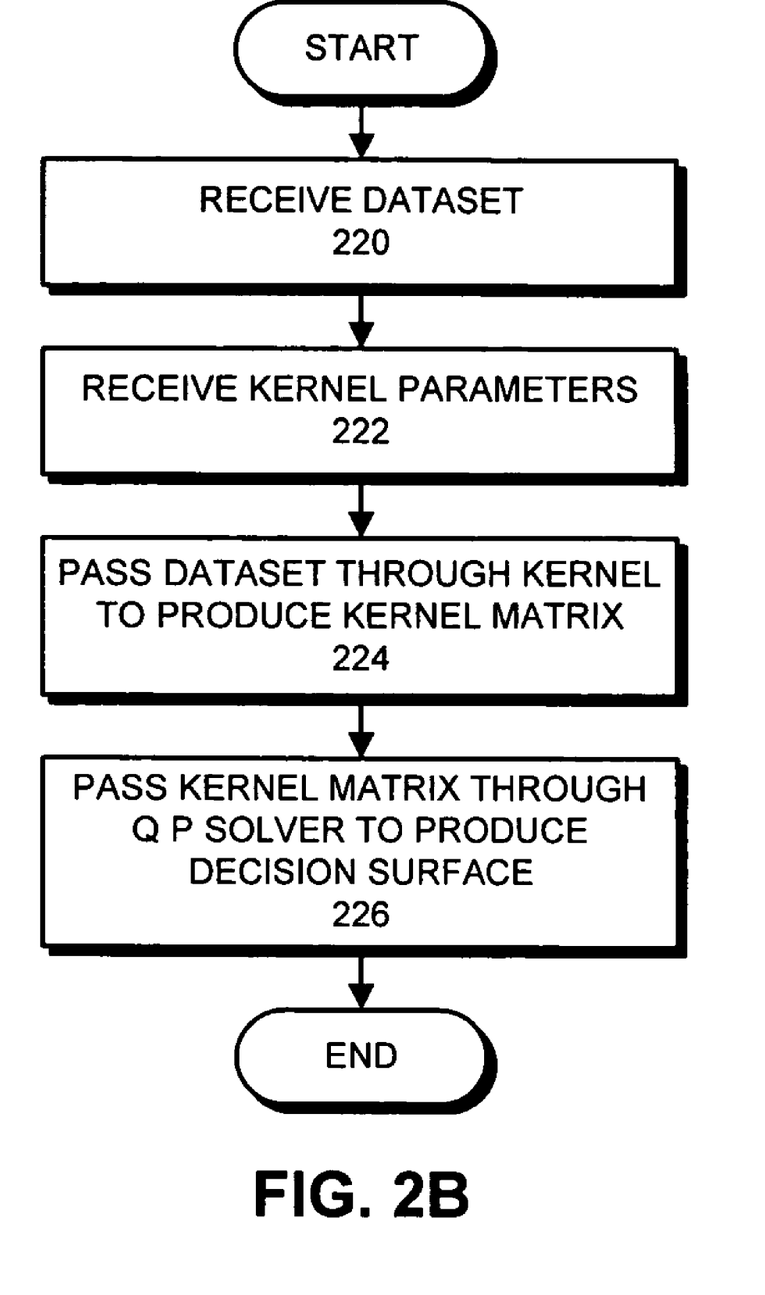
FIG. 2B presents a flow chart illustrating how a support vector machine (SVM) operates in accordance with an embodiment of the present invention.
Figure 3:
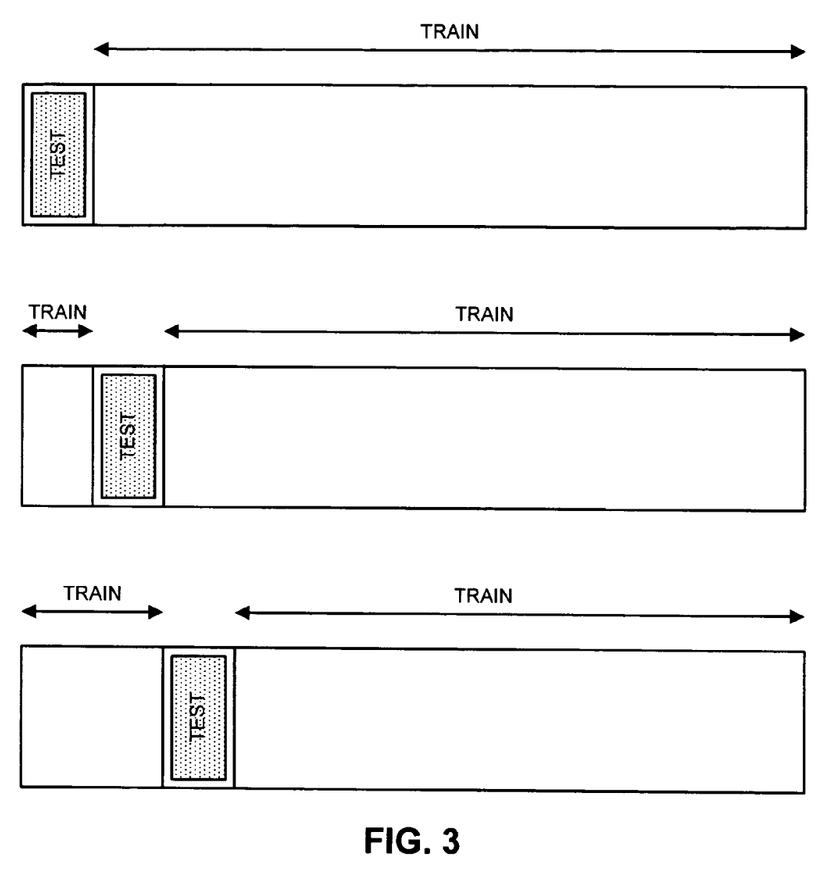
FIG. 3 illustrates the leave-out-one cross-validation technique in accordance with an embodiment of the present invention.

FIG. 2A and the flow chart in 2B illustrate how a support vector machine (SVM) operates on a data set in accordance with an embodiment of the present invention. First, the system receives a data set 202, for example containing protein signatures for patients who may have cancer (step 220). The system also receives kernel parameters, $\gamma$ and $\delta$ 206 (step 222).

Next, the system passes data set 202 through kernel 204 to produce a resulting kernel matrix 208 (step 224). This process maps data set 202 from a low-dimensional input space to a higher-dimensional feature space.

The system then passes kernel matrix 208 through QP solver 210 (step 226), which performs a quadratic optimization operation to produce decision surface 214. Note that decision surface 214 can include a separating hyperplane, which separates members of different groups in feature space 212.

This process is typically performed sequentially on a single-processor machine. However, this single-processor mode of operation has become a limitation. In order to minimize the misclassification probabilities for the SVM, it becomes advantageous to use as many vectors as possible for training the SVM. However, the amount of memory used in representing the kernel matrix for n vectors increases as $O(n^2)$. This quickly consumes the resources on most commercially available machines, and becomes a bottleneck problems with large output spectra from recent, high-resolution mass spectrometers being used with Proteomics.

During the quadratic optimization step operation in step 226, the system attempts to find the optimal separating hyperplane (decision surface) in the feature space using Lagrange multipliers as described below, $$W(\alpha) = \sum_{i=1}^{l} \alpha_i - \frac{1}{2} \sum_{i,j=1}^{l} \alpha_i \alpha_j y_i y_j K(x_i, x_j). \quad (1)$$

under the constraints, $$\sum_{i=1}^{l} \alpha_i y_i = 0,$$

and, $$0 \leq \alpha_i \leq C, i=1, \ldots, l.$$

where, $\alpha_i$ are the Lagrange multipliers, $y_i \epsilon <-1,1>$, $x \epsilon <x_1, x_2, \ldots, x_l>$, where "l" is the number of dimensions, and where $K(x_i, x_j)$ is the kernel function. When the optimal set of $\alpha_i^0$ are found, any test vector x can be classified by evaluating, $$sgn \left\| \sum_{i=1}^{l} \alpha_i^0 y_i K(x_i, x) + b \right\|.$$

The summation term in equation (1) is equivalent to a matrix multiplication step. For a matrix of size n, matrix multiplication has a complexity of $O(n^3)$, or at best (using Strassen's algorithm) $O(n^{log_2(7)})$. This creates a problem for single-processor machines because it takes an unacceptably long period of time to arrive at a solution for large values of n.

SVMs typically outperform conventional classification techniques such as k-means, neural networks, naïve Bayes, and decision trees by displaying high sensitivity and specificity for categorization of test data. However, they continue to show minor false and missed alarms in their classification. It is desirable to minimize the false and missed alarm cases in the clinical trial qualification process, because misclassification in the patients leads to false/missed alarms for the drug discovery phase too, and thereby incurs further costs on the drug company to conduct extensive trials.

The accuracy of prediction is dependent on the choice of the kernel used in the training step. Most kernel functions have certain input parameters that need to be chosen. One embodiment of the present invention uses a polynomial kernel, which can be defined as follows, $$K(x,y) = (\gamma x \cdot y + 1)^\delta$$

where x and y are input vectors. The kernel parameters $\gamma$ and $\delta$ are ideally chosen so that the overall sensitivity of the SVM is optimized. Conventional techniques have attempted to use genetic algorithms on a single-processor machine. However, this takes too much time for a large parameter space, such as those that arise from using input data from the latest mass spectrometers (where a mass spectra "fingerprint" from a single serum sample can be as much as 10 Gbytes). Note that there presently exists no systematic technique for selecting optimal kernel parameters for SVMs on a given data set.

Process of Optimizing Kernel Parameters

One embodiment of the present invention uses a genetic algorithm technique in a parallel framework on a group of cooperating computational nodes. This technique optimizes the kernel parameters $\gamma$ and $\delta$ so as to minimize classification errors of the SVMs while classifying serum samples. (This genetic algorithm technique is described in "The Genetic Algorithm in Computer Science," by Eric Krevice Prebys, *MIT Undergraduate Journal of Mathematics*.) It involves: (1) using a plurality of possible solutions to the problem, encoded in a predetermined manner; (2) using breeding mechanisms to generate new genotypes from a given collection of genotypes; (3) evaluating the error using a particular genotype; and (4) selecting the fittest of the genotypes to form a new generation of genotypes. The $Error_{Cost}$ function used to drive the genetic technique is defined in the equation below.

$$Error_{Cost} = \text{False Alarm} + \text{Missed Alarm} \quad (2)$$

Figure 5:
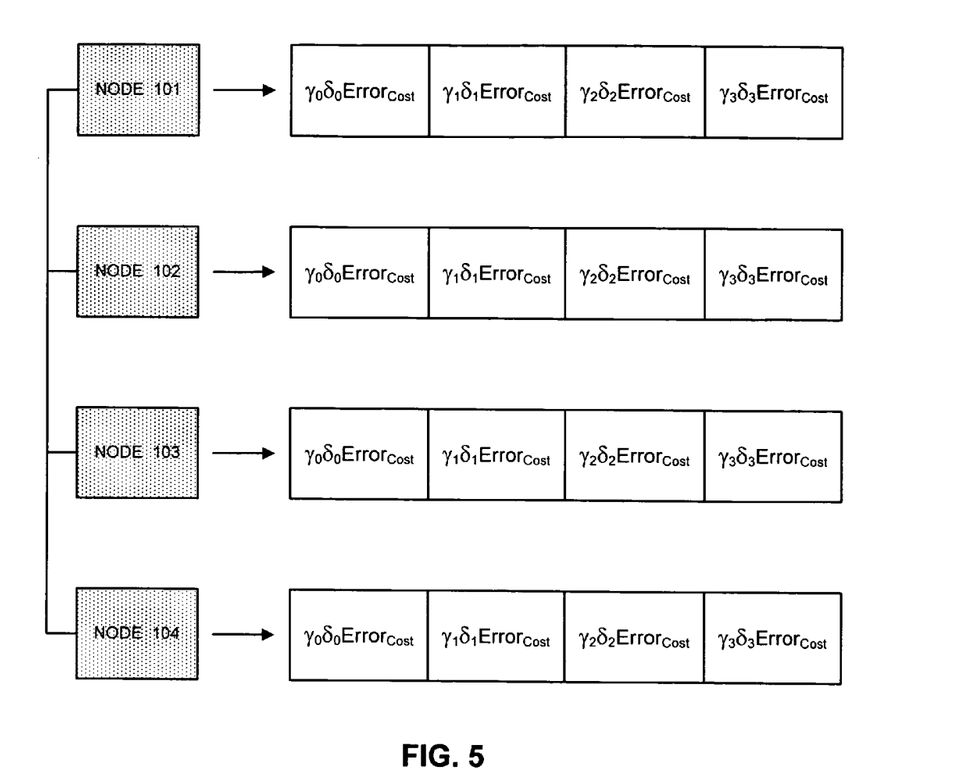
FIG. 5 illustrates how error cost values from different nodes are assembled at each node in accordance with an embodiment of the present invention.

The value of $Error_{Cost}$ is computed by using a "leave-one-out" cross-validation technique (described in Fukunaga, K. and Hummels, D. M., "Leave-One-Out Procedures for Nonparametric Error Estimates," *IEEE Transactions on Pattern Analysis and Machine Intelligence*, Vol. II, No. 4, April 1989). The leave-one-out cross-validation technique is a popular cross-validation technique to evaluate Support Vector Machine kernels. In this cross-validation process, one vector is omitted in the training process and the Support Vector Machine is trained on the rest. The omitted vector is then tested against the trained kernel. Note that we are in a position to evaluate the testing because we know a priori the class of the testing vector. The classification or misclassification is recorded. The process is repeated for all vectors. The sum of the misclassifications recorded is the total $Error_{Cost}$. FIG. 5 illustrates this process.

The system starts with a couple of initial conditions/assumptions. (1) There are "p" computational nodes at our disposal, and (2) a genotype describing a given choice of kernel parameters for our preferred embodiment is $\Delta = \{\delta, \gamma\}$.

The first step in the process is initialization, where all the nodes are initialized to contain an empty vector of $Error_{Cost}$, which has size "p", and which is initialized to "0". Every node picks random values for $\delta$ and $\gamma$ (different from its peers), which are chosen from the ranges [0,12] and [0,3], respectively. Early research in this field by has shown that the preceding ranges are close to optimal for the types of Life Sciences problems addressed by one embodiment of the present invention. The number of genotypes is initialized to "p".

Figure 4:
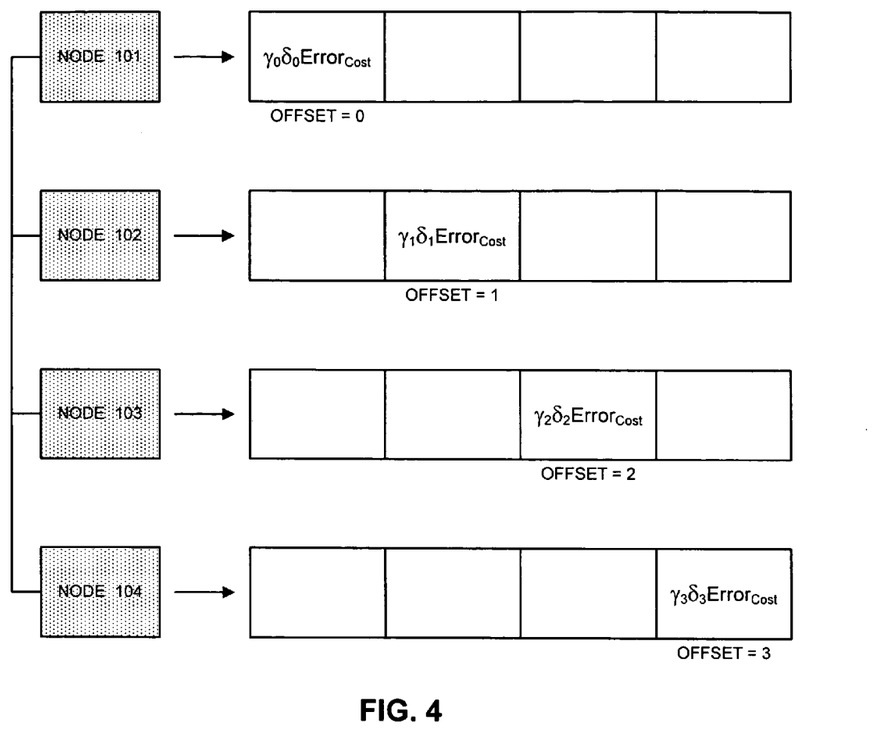
FIG. 4 illustrates how each node computes an error cost for a set of kernel parameters in accordance with an embodiment of the present invention.

The second step is the cross validation. A "leave-one-out" technique is used for this. The cross-validation process returns a total $Error_{Cost}$ value, which is recorded in the array at the appropriate offset. This is illustrated in FIG. 4.

The third step is an all-to-all communication step, wherein each node communicates its $Error_{Cost}$ to every other node connected via a network. During this step every node transmits its recorded $Error_{Cost}$ to all its peers and, all nodes are aware of every other node's $Error_{Cost}$. This is illustrated in FIG. 5.

The fourth step is the elimination step. The $Error_{Cost}$ vector is a multi-column array which is sorted in descending order of $Error_{Cost}$. The first two columns are the parameters $\gamma$ and $\delta$ and the third is $Error_{Cost}$. Entries associated with the lower 50% of $Error_{Cost}$ are eliminated, because they are deemed to have traits that are not conducive to generate efficient kernels. After the elimination process, none of the values of $\gamma$ and $\delta$ for the lower 50% of the $Error_{Cost}$ vector is considered to further.

Figure 6:
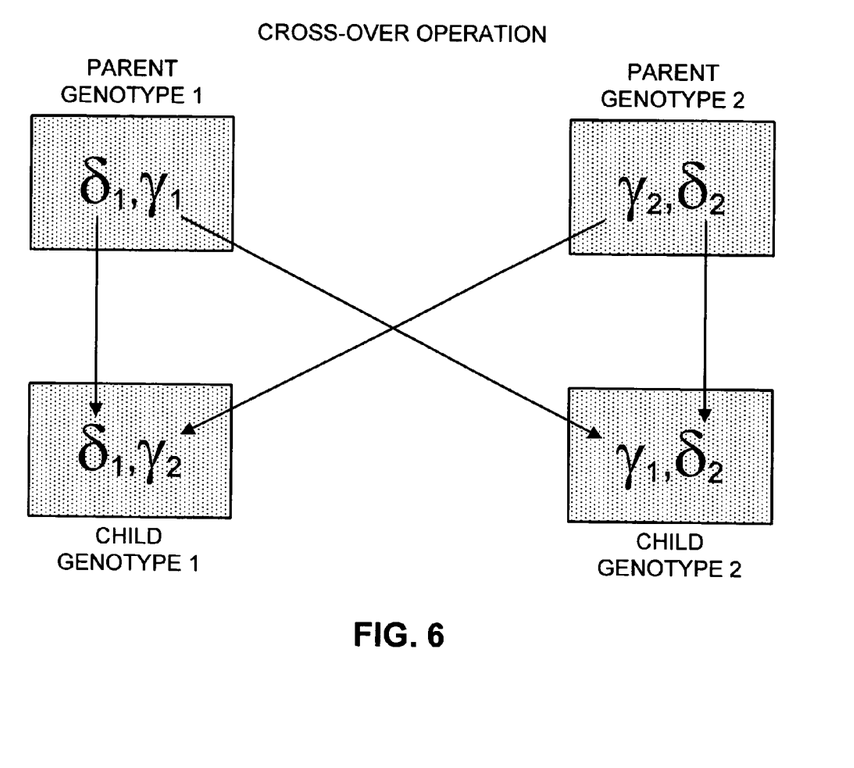
FIG. 6 illustrates the cross-over operation in accordance with an embodiment of the present invention.

The fifth and step is the cross-over operation. During the cross-over operation, two parent genotypes are combined by mixing their traits to generate two child genotypes. In one embodiment of the present invention, the parameters $\gamma$ and $\delta$ are the traits. During the cross-over operation between any two genotypes, the values of $\gamma$ are exchanged. This is shown schematically in the FIG. 6. The strongest genotype is crossed over with the weakest in the surviving 50%. For example, if there are 100 genotypes, after eliminating the lower 50, #1 is crossed over with #50, #2 with #49 and so on. This ensures that more of the stronger survive longer in the evolution process to eventually generate a winner.

Figure 7:
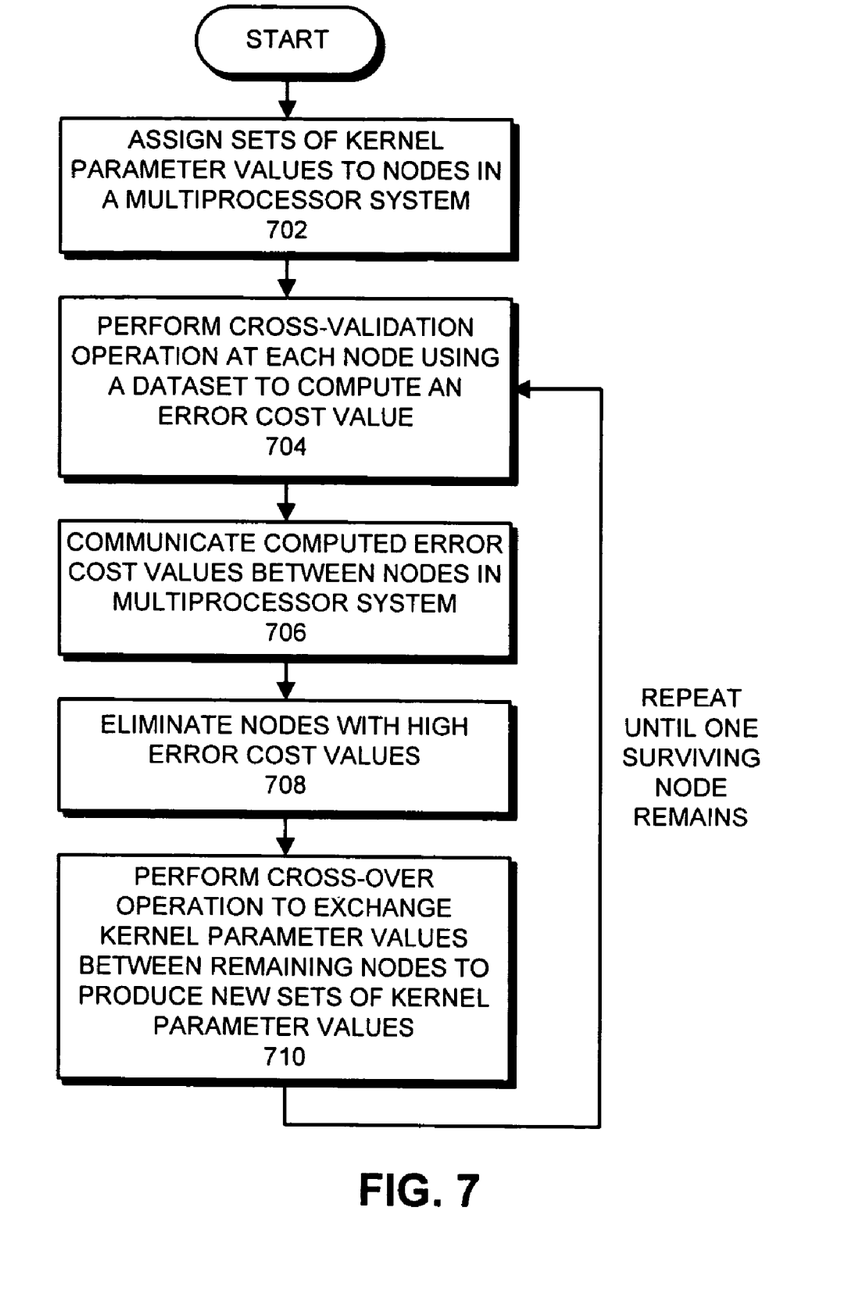
FIG. 7 illustrates how kernel parameter values are optimized in accordance with an embodiment of the present invention.

This process is repeated until a global winner emerges. The entire technique is illustrated in FIG. 7. Also, pseudo-code for the technique appears in Table 1 below.

TABLE 1

```
Procedure: random(range)
    return a random number in the specified range.
Init:
    num_genotype ← p;
    Error_Cost[ ] ← 0;
Foreach node
while(num_genotype > 1)
    cross_validate(δ, γ);
    all_to_all_communicate_cost( );
    eliminate( );
    cross_over( );
print optimal winning δ,γ.
```

Hence, the process of optimizing kernel parameters can be summarized as follows. The system first assigns sets of kernel parameters values to different nodes in the multiprocessor system (step 702). This can involve assigning sets of random kernel parameter values from a valid range of kernel parameter values. It can alternatively involve assigning sets of kernel parameter values associated with grid points that span a valid range of kernel parameter values.

Next, the system performs a cross-validation operation at each node using a data set of interest to compute an error cost value for the node (step 704).

The nodes then communicate the computed error cost values with each other (step 706).

Next, the error cost values are sorted at each node and the nodes with higher error cost values are eliminated (step 708).

The system then performs a cross-over operation to exchange kernel parameter values between remaining nodes, thereby producing new sets of kernel parameter values (step 710).

The process described in steps 704-710 is subsequently repeated until a global winning set of kernel parameter values emerges.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for optimizing support vector machine (SVM) kernel parameters, comprising:
   assigning sets of kernel parameter values to each node in a multiprocessor system;
   performing a cross-validation operation at each node in the multiprocessor system based on a data set, wherein the cross-validation operation computes an error cost value reflecting the number of misclassifications that arise while classifying the data set using the assigned set of kernel parameter values;
   communicating the computed error cost values between nodes in the multiprocessor system;
   eliminating nodes with relatively high error cost values;
   performing a cross-over operation in which kernel parameter values are exchanged between remaining nodes to produce new sets of kernel parameter values;
   repeating the cross-validating, communicating eliminating, and cross-over operations until a global winning set of kernel parameter values is determined;
   producing the global winning set of kernel parameters; and
   using the kernel parameters in the kernel function of the SVM to map the data set from a low-dimensional input space to a higher-dimensional feature space.

2. The method of claim 1, wherein assigning sets of kernel parameter values involves assigning sets of random kernel parameter values from a valid range of kernel parameter values.

3. The method of claim 1, wherein assigning sets of kernel parameter values involves assigning sets of kernel parameter values associated with grid points that span a valid range of kernel parameter values.

4. The method of claim 1, wherein performing the cross-validation operation involves using a leave-out-one validation technique in which one vector is omitted during the training process and the omitted vector is subsequently tested against the trained kernel, and wherein the process is repeated for each vector in the data set.

5. The method of claim 1, wherein eliminating nodes with relatively high error cost values involves:
   sorting nodes in the multiprocessor system based on associated error cost values; and
   eliminating half of the nodes with the highest error cost values.

6. The method of claim 1,
   wherein there are two kernel parameter values γ and δ; and
   wherein performing the cross-over operation involves exchanging γ values between remaining nodes.

7. The method of claim 1, wherein classifying the data set using the assigned kernel parameter values involves:
   using the assigned set of kernel parameter values in a kernel function that maps the data set from a low-dimensional input space to a higher-dimensional feature space; and
   performing a quadratic optimization operation, which generates a substantially optimal decision surface in the feature space, wherein the decision surface classifies vectors in the data set with a given error cost.

8. A computer-readable storage medium storing instructions that when executed by a computer cause the computer to perform a method for optimizing support vector machine (SVM) kernel parameters, the method comprising:
   assigning sets of kernel parameter values to each node in a multiprocessor system;
   performing a cross-validation operation at each node in the multiprocessor system based on a data set, wherein the cross-validation operation computes an error cost value reflecting the number of misclassifications that arise while classifying the data set using the assigned set of kernel parameter values;
   communicating the computed error cost values between nodes in the multiprocessor system;
   eliminating nodes with relatively high error cost values;
   performing a cross-over operation in which kernel parameter values are exchanged between remaining nodes to produce new sets of kernel parameter values;
   repeating the cross-validating, communicating, eliminating, and cross-over operations until a global winning set of kernel parameter values is determined;
   producing the global winning set of kernel parameters; and
   using the kernel parameters in the kernel function of the SVM to map the data set from a low-dimensional input space to a higher-dimensional feature space.

9. The computer-readable storage medium of claim 8, wherein assigning sets of kernel parameter values involves assigning sets of random kernel parameter values from a valid range of kernel parameter values.

10. The computer-readable storage medium of claim 8, wherein assigning sets of kernel parameter values involves assigning sets of kernel parameter values associated with grid points that span a valid range of kernel parameter values.

11. The computer-readable storage medium of claim 8, wherein performing the cross-validation operation involves using a leave-out-one validation technique in which one vector is omitted during the training process and the omitted vector is subsequently tested against the trained kernel, and wherein the process is repeated for each vector in the data set.

12. The computer-readable storage medium of claim 8, wherein eliminating nodes with relatively high error cost values involves:
   sorting nodes in the multiprocessor system based on associated error cost values; and
   eliminating half of the nodes with the highest error cost values.

13. The computer-readable storage medium of claim 8, wherein there are two kernel parameter values $\gamma$ and $\delta$; and
   wherein performing the cross-over operation involves exchanging $\gamma$ values between remaining nodes.

14. The computer-readable storage medium of claim 8, wherein classifying the data set using the assigned kernel parameter values involves:
   using the assigned set of kernel parameter values in a kernel function that maps the data set from a low-dimensional input space to a higher-dimensional feature space; and
   performing a quadratic optimization operation, which generates a substantially optimal decision surface in the feature space, wherein the decision surface classifies vectors in the data set with a given error cost.

15. An apparatus that optimizes support vector machine (SVM) kernel parameters, comprising:
   an assignment mechanism configured to assign sets of kernel parameter values to each node in a multiprocessor system;
   a cross-validation mechanism configured to perform a cross-validation operation at each node in the multiprocessor system based on a data set, wherein the cross-validation mechanism computes an error cost value reflecting the number of misclassifications that arise while classifying the data set using the assigned set of kernel parameter values;
   a communication mechanism configured to communicate the computed error cost values between nodes in the multiprocessor system;
   an elimination mechanism configured to eliminate nodes with relatively high error cost values;
   a cross-over mechanism configured to perform a cross-over operation in which kernel parameter values are exchanged between remaining nodes to produce new sets of kernel parameter values, wherein the apparatus continues iteratively producing, cross-validating and eliminating sets of kernel parameter values until a global winning set of kernel parameter values emerges;
   a production mechanism configured to produce the global winning set of kernel parameters; and
   a computation mechanism configured to use the kernel parameters in the kernel function of the SVM to map the data set from a low-dimensional input space to a higher-dimensional feature space.

16. The apparatus of claim 15, wherein the cross-validation mechanism is configured to use a leave-out-one validation technique in which one vector is omitted during the training process and the omitted vector is subsequently tested against the trained kernel, and wherein the process is repeated for each vector in the data set.

17. The apparatus of claim 15, wherein the cross-validation mechanism is configured to classify the data set using the assigned set of kernel parameter values by:
   using the assigned set of kernel parameter values in a kernel function that maps the data set from a low-dimensional input space to a higher-dimensional feature space; and
   performing a quadratic optimization operation, which generates a substantially optimal decision surface in the feature space, wherein the decision surface classifies vectors in the data set with a given error cost.

* * * * *